(12) United States Patent
Ohtomo et al.

(10) Patent No.: US 11,460,548 B2
(45) Date of Patent: Oct. 4, 2022

(54) SURVEYING DEVICE

(71) Applicant: TOPCON CORPORATION, Tokyo (JP)

(72) Inventors: Fumio Ohtomo, Asaka (JP); Kaoru Kumagai, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 862 days.

(21) Appl. No.: 16/365,243

(22) Filed: Mar. 26, 2019

(65) Prior Publication Data

US 2019/0302236 A1 Oct. 3, 2019

(30) Foreign Application Priority Data

Mar. 28, 2018 (JP) .............................. JP2018-061335

(51) Int. Cl.
*G01S 7/48* (2006.01)
*G01S 17/08* (2006.01)
*G01S 7/481* (2006.01)

(52) U.S. Cl.
CPC .......... *G01S 7/4816* (2013.01); *G01S 7/4808* (2013.01); *G01S 17/08* (2013.01)

(58) Field of Classification Search
CPC ...... G01S 7/4816; G01S 7/4808; G01S 17/08; G01C 15/002
See application file for complete search history.

(56) References Cited

U.S. PATENT DOCUMENTS

| 5,100,229 | A | * | 3/1992 | Lundberg | ............. | G01C 15/002 |
|---|---|---|---|---|---|---|
| | | | | | | 356/141.5 |
| 10,048,377 | B2 | | 8/2018 | Ohtomo et al. | | |
| 10,088,307 | B2 | | 10/2018 | Ohtomo et al. | | |
| 10,101,441 | B2 | | 10/2018 | Ohtomo et al. | | |
| 11,236,997 | B2 | * | 2/2022 | Tanaka | ................... | G06V 10/24 |

FOREIGN PATENT DOCUMENTS

| JP | 2016-151422 A | 8/2016 |
|---|---|---|
| JP | 2016-151423 A | 8/2016 |
| JP | 2016-161411 A | 9/2016 |
| JP | 6410258 B | 10/2018 |

* cited by examiner

*Primary Examiner* — Seung C Sohn
(74) *Attorney, Agent, or Firm* — Chiesa Shahinian & Giantomasi PC

(57) ABSTRACT

A surveying device body includes a distance measuring section to measure a distance to the measurement target, an optical axis deflector that deflects distance measuring light with respect to a reference optical axis, a measurement direction imaging section that obtains an observation image, and an attitude detector that detects an incline of the surveying device body. A computation controller displays a portion of the observation image on the display unit, computes a direction angle of the distance measuring optical axis on the basis of a detection result of the attitude detector and a deflection angle of the distance measuring optical axis with respect to the reference optical axis, and measures the measurement target on the basis of the direction angle and a distance measurement result of the distance measuring section using a reference point as a reference.

5 Claims, 17 Drawing Sheets

SURVEYING DEVICE

CROSS-REFERENCE TO RELATED APPLICATIONS

This application claims priority to Japanese Patent Application No. 2018-061335, filed on Mar. 28, 2018, the entire disclosure of which is incorporated by reference herein.

TECHNICAL FIELD

The present invention relates to a surveying device that can be easily installed and achieves improved workability.

BACKGROUND

When surveying is performed using a surveying device, the surveying device first needs to be installed on a reference point. Generally, when installing the surveying device on a reference point, a tripod is used, and the surveying device must be set horizontally level on the tripod with a machine center (surveying reference position) of the surveying device accurately positioned on a vertical line passing through the reference point. Furthermore, a height from the reference point to the machine center (device height of the surveying device) must also be measured. Thus, the task of installing a surveying device is complex, requiring time and skill.

Related art is described in Japanese Patent Publication No. 2016-151422 A.

SUMMARY

An object of the present invention is to provide a surveying device that can be easily installed in a short period of time, and simplifies collimation work without requiring skills in installation work.

According to an embodiment, the surveying device includes a monopole to be installed on a reference point; a surveying device body, with a reference optical axis, provided at a known distance from a lower end of the monopole and at a known angle with respect to an axial center of the monopole; and a control panel provided to the monopole and including a display unit. The surveying device body includes a distance measuring section that irradiates a measurement target with a distance measuring light and receives a reflected distance measuring light to measure a distance to the measurement target, an optical axis deflector that deflects the distance measuring light with respect to the reference optical axis, a measurement direction imaging section that obtains an observation image centered about or substantially centered about the reference optical axis and that includes the measurement target, an attitude detector that detects an incline of the surveying device body with respect to the horizontal, and a computation controller. The computation controller displays a portion of the observation image on the display unit as a collimation image, deflects a distance measuring optical axis by the optical axis deflector on the basis of a difference between a center of the observation image and a center of the collimation image in the observation image so that the distance measuring optical axis becomes the center of the collimation image, computes a direction angle of the distance measuring optical axis on the basis of a detection result of the attitude detector and a deflection angle of the distance measuring optical axis with respect to the reference optical axis, and measures the measurement target on the basis of the direction angle and a distance measurement result of the distance measuring section using the reference point as a reference.

According to an embodiment, the computation controller is configured to control the optical axis deflector so that the deflection angle becomes a predetermined magnification of an inclination angle detected by the attitude detector.

According to an embodiment, the computation controller is configured to rotate an image displayed on the display unit on the basis of a detection result of the attitude detector so that the image is controlled to become vertical.

According to an embodiment, the computation controller is configured to control the optical axis deflector so that the distance measuring light is locally scanned with the distance measuring optical axis serving as the center.

According to an embodiment, the computation controller is configured to detect fluctuation during measurement from movement between a plurality of images, superimpose a plurality of images to create an average image, change local scan data during measurement in accordance with fluctuation detection, and overlay the data on the average image.

According to an embodiment, the surveying device includes a monopole to be installed on a reference point; a surveying device body, with a reference optical axis, provided at a known distance from a lower end of the monopole and at a known angle with respect to an axial center of the monopole; and a control panel provided to the monopole and including a display unit. The surveying device body includes a distance measuring section that emits a distance measuring light to a measurement target and receives a reflected distance measuring light to measure a distance to the measurement target, an optical axis deflector that deflects the distance measuring light with respect to the reference optical axis, a measurement direction imaging section that obtains an observation image centered about or substantially centered about the reference optical axis and that includes the measurement target, an attitude detector that detects an incline of the surveying device body with respect to the horizontal, and a computation controller. The computation controller displays a portion of the observation image on the display unit as a collimation image, deflects a distance measuring optical axis by the optical axis deflector on the basis of a difference between a center of the observation image and a center of the collimation image in the observation image so that the distance measuring optical axis becomes the center of the collimation image, computes a direction angle of the distance measuring optical axis on the basis of a detection result of the attitude detector and a deflection angle of the distance measuring optical axis with respect to the reference optical axis, and measures the measurement target on the basis of the direction angle and a distance measurement result of the distance measuring section using the reference point as a reference. As a result, the surveying device exhibits excellent effects of allowing measurement by simply installing the lower end of the monopole on the reference point without the need for leveling work, and allowing simple collimation by operating the monopole.

DETAILED DESCRIPTION

Embodiments of the invention will be described next with reference to the drawings.

Figure 1:
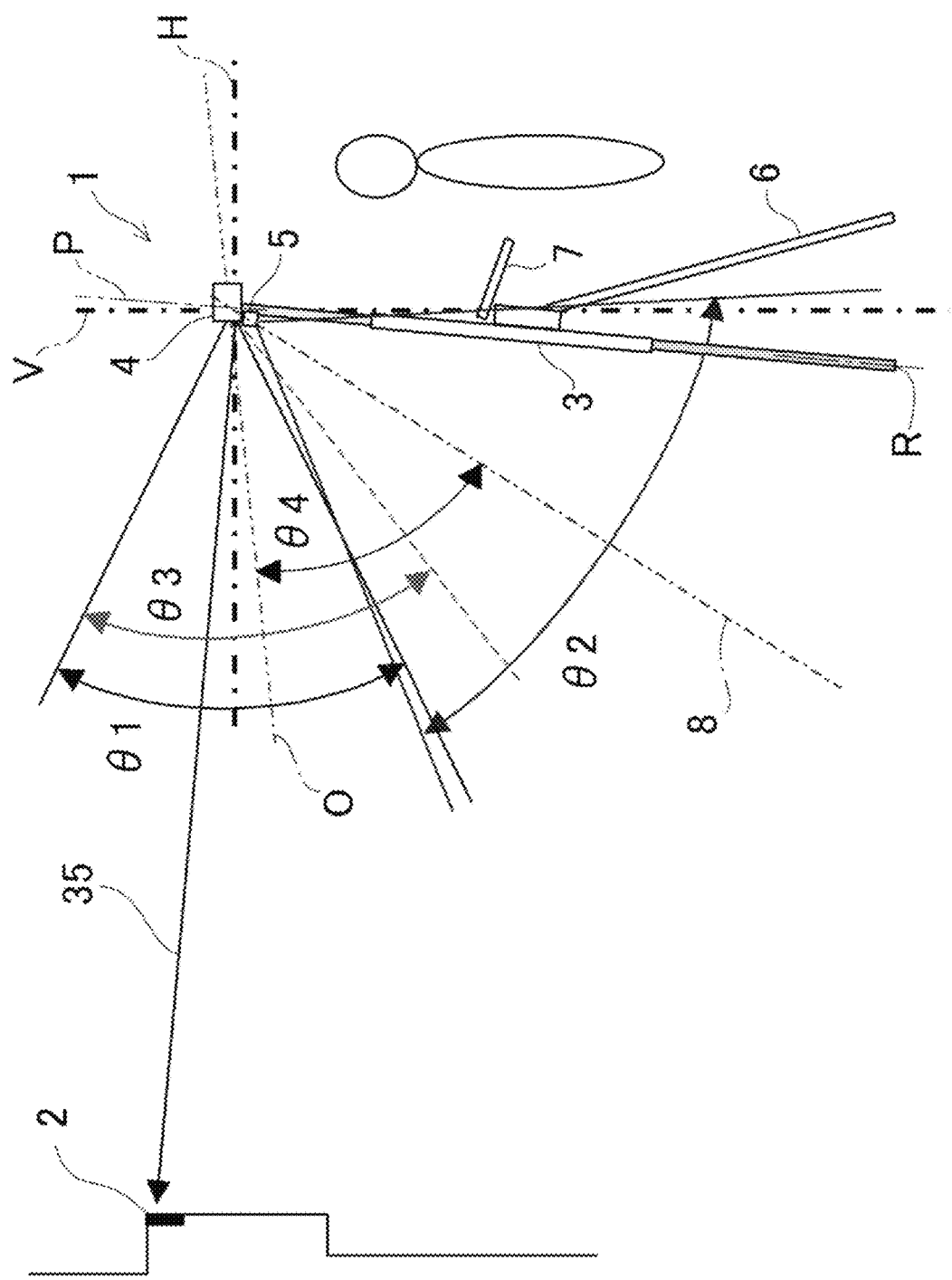
FIG. 1 is a schematic view illustrating a first embodiment.

FIG. 1 is a diagram illustrating an overview of a first embodiment of the present invention. In FIG. 1, 1 denotes a surveying device of a monopole support system, and 2 denotes a measurement target.

The surveying device 1 is mainly provided with a monopole 3, a surveying device body 4 provided on an upper end of the monopole 3, and a control panel 7 in a suitable position of the monopole 3, such as a position that enables easy operation by a measurement operator in a standing posture, for example.

The control panel 7 may be provided in a fixed or a detachable manner to the monopole 3. The control panel 7 is operable when attached to the monopole 3, and may be detached from the monopole 3 and operable as a single unit. The control panel 7 and the surveying device body 4 allow data communication via various communication means, such as wired or wireless.

Further, one auxiliary pole 6 is foldably attached in a position below the control panel 7 of the monopole 3.

A lower end of the monopole 3 is pointed, and installed at a reference point R (point serving as a reference of measurement). A distance from the lower end of the monopole 3 to a machine center of the surveying device body 4 (point of reference for measurement of the surveying device body 4) is known.

An optical system of the surveying device body 4 includes a reference optical axis O extending in an approximate horizontal direction. The reference optical axis O is set so as to incline downward at a predetermined angle with respect to a line orthogonal to an axial center P of the monopole 3. Thus, when the monopole 3 is vertically set, the reference optical axis O is inclined downward at the predetermined angle with respect to the horizontal.

The auxiliary pole 6 is foldably connected to the monopole 3 at the upper end and, in a folded state, comes into close contact with the monopole 3, and a lock mechanism is provided that holds the auxiliary pole 6 in a close contact state. Or, a band (not illustrated) that simply bundles the monopole 3 and the auxiliary pole 6 may be provided. With the auxiliary pole 6 in a folded state, an operator can grip the monopole 3 and perform measurement.

The auxiliary pole 6 can be rotated about the upper end at a predetermined angle and separated from the monopole 3, and is fixable in a separated position. With use of the auxiliary pole 6, the surveying device body 4 is supported at two points by the auxiliary pole 6 and the monopole 3, the support of the surveying device body 4 is stabilized, and the stability of measurement by the surveying device body 4 is improved. Further, while the auxiliary pole 6 has been described as singular, two may exist. In this case, the monopole 3 is self-standing.

The surveying device body 4 includes a distance measuring section 24 (described later), and a measurement direction imaging section 21 (described later), and a downward imaging section 5 is provided on the surveying device body 4. The reference optical axis of the optical system of the distance measuring section 24 is the reference optical axis O. The optical axis (hereinafter, first imaging optical axis 61) of the measurement direction imaging section 21 is inclined upward at a predetermined angle (6°, for example) with respect to the reference optical axis O, and a distance and a positional relationship between the measurement direction imaging section 21 and the distance measuring section 24 are known. The distance measuring section 24 and the measurement direction imaging section 21 are stored in a housing interior of the surveying device body 4.

As the downward imaging section 5, an imaging device that includes an imaging element such as a charge-coupled device (CCD) or a complementary metal-oxide-semiconductor (CMOS), and that is capable of obtaining digital images is used. Further, a position of a pixel in the imaging element is detectable with an optical axis (hereinafter, second imaging optical axis 8) of the downward imaging section 5 serving as a reference. For example, coordinates in a coordinate system with the second imaging optical axis 8 serving as the origin are detectable. Further, as the downward imaging section 5, a commercial digital camera may be used.

The downward imaging section 5 is fixed to the housing of the surveying device body 4, and the downward imaging section 5 (that is, an image formation position of the downward imaging section 5) is provided in a known position with respect to the machine center of the surveying device body 4. The second imaging optical axis 8 is directed downward and fixed at a predetermined known angle with respect to the reference optical axis O, and the second imaging optical axis 8 and the reference optical axis O have a known relationship. Furthermore, the downward imaging section 5 is housed in the housing and integrated with the surveying device body 4.

Given θ1 as a field angle of the measurement direction imaging section 21 and θ2 as a field angle of the downward imaging section 5, θ1 and θ2 may be equal or different. Additionally, the field angle of the measurement direction imaging section 21 and the field angle of the downward imaging section 5 may not overlap, but preferably overlap by a predetermined amount. Additionally, the field angle of the downward imaging section 5 and the direction of the second imaging optical axis 8 are set so that the lower end of the monopole 3 is included in the image.

Figure 2:
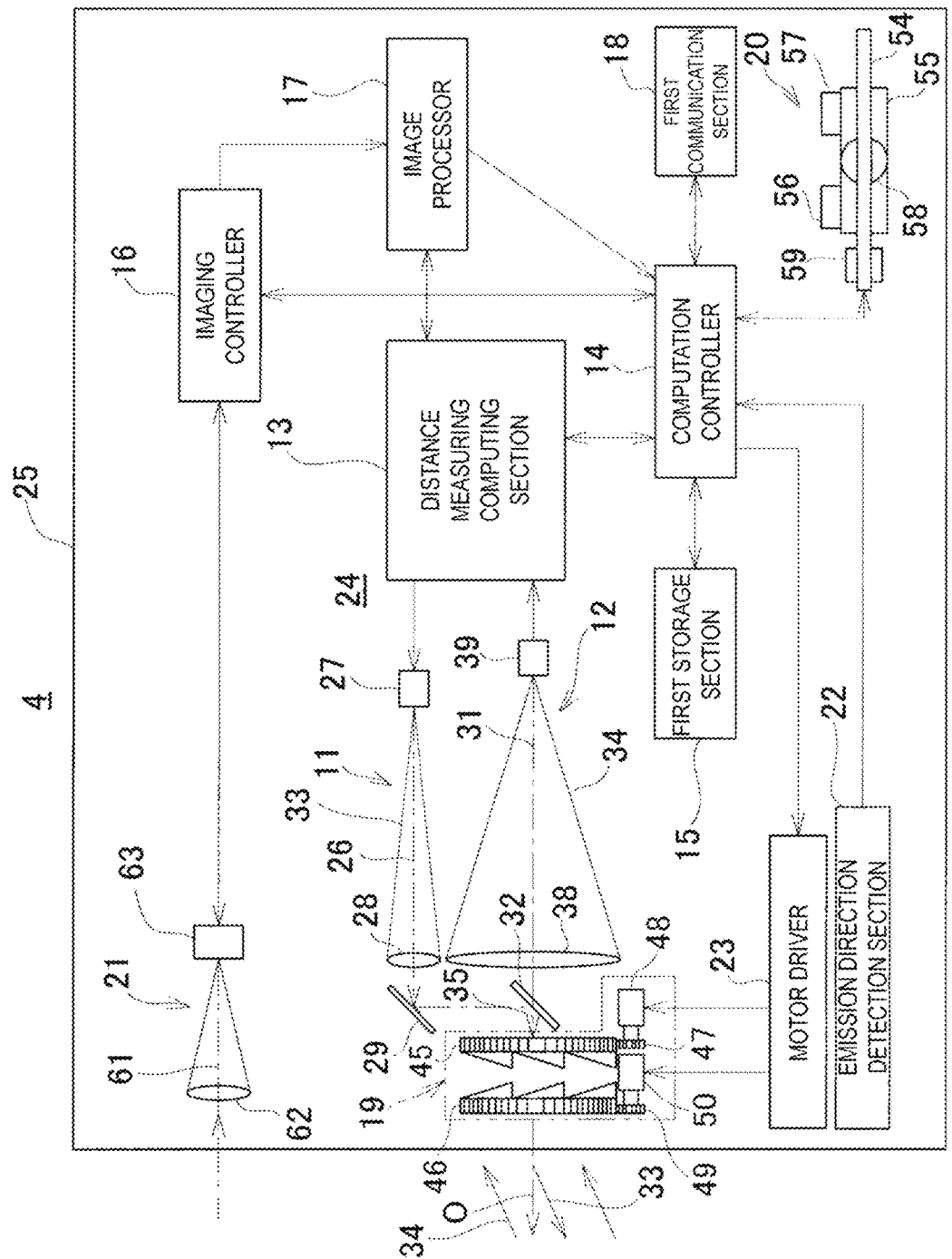
FIG. 2 is a general block diagram illustrating a surveying device body.

The general configuration of the surveying device body 4 will be described below with reference to FIG. 2.

The surveying device body 4 includes a distance measuring light emitting section 11, a receiving section 12, a distance measuring computing section 13, a computation controller 14, a first storage section 15, an imaging controller 16, an image processor 17, a first communication section 18, an optical axis deflector 19, an attitude detector 20, the measurement direction imaging section 21, an emission direction detection section 22, and a motor driver 23, and these are stored and integrated in a housing 25. Furthermore, the distance measuring emitting section 11, the receiving section 12, the distance measuring computing section 13, the optical axis deflector 19, and the like constitute the distance measuring section 24.

The distance measuring light emitting section 11 includes an emission optical axis 26, and a light emitting element 27, such as a laser diode (LD), for example, is provided on the emission optical axis 26. Additionally, a projection lens 28 is provided on the emission optical axis 26. Furthermore, the emission optical axis 26 is deflected so as to match a reception optical axis 31 (described later) by a first reflection mirror 29 serving as a deflection optical member provided on the emission optical axis 26, and a second reflection mirror 32 serving as a deflection optical member provided on the reception optical axis 31. The first reflection mirror 29 and the second reflection mirror 32 constitute an emission optical axis deflector.

The distance measuring computing section 13 causes the light emitting element 27 to emit light, and the light emitting element 27 produces a laser beam. The distance measuring light emitting section 11 emits the laser beam produced from the light emitting element 27 as distance measuring light 33. The laser beam used may be a continuous light, a pulse light, or the intermittent modulation light indicated in JP 2016-161411 A.

Next, the receiving section 12 will be described. A reflected distance measuring light 34 from the measurement target 2 is made incident on the receiving section 12. The receiving section 12 includes the reception optical axis 31, and the emission optical axis 26 deflected by the first reflection mirror 29 and the second reflection mirror 32 coincides with the reception optical axis 31. The state in which the emission optical axis 26 and the reception optical axis 31 coincide is referred to as a distance measuring optical axis 35.

The optical axis deflector 19 is arranged on the reference optical axis O. The straight optical axis passing through a center of the optical axis deflector 19 is the reference optical axis O. The reference optical axis O coincides with the emission optical axis 26, the reception optical axis 31, or the distance measuring optical axis 35 when not deflected by the optical axis deflector 19.

An imaging lens 38 is arranged on the reception optical axis 31 where the reflected distance measuring light 34 passes through the optical axis deflector 19 and is incident. Additionally, a light receiving element 39 such as an avalanche photodiode (APD), for example, is provided on the reception optical axis 31. The imaging lens 38 forms an image of the reflected distance measuring light 34 on the light receiving element 39. The light receiving element 39 receives the reflected distance measuring light 34 and produced a light reception signal. The light reception signal is input into the distance measuring computing section 13, and the distance measuring computing section 13 computes a to-and-fro time of the distance measuring light on the basis of the light reception signal, and measures the distance to the measurement target 2.

The first communication section 18 sends image data obtained by the measurement direction imaging section 21, image data processed by the image processor 17, and distance measurement data obtained by the distance measuring section 24 to the control panel 7, and receives an operation command from the control panel 7.

The first storage section 15 stores various programs, such as an imaging control program; an image processing program; a distance measuring program; a display program; a communication program; an operation command creation program; an inclination angle computation program that computes an inclination angle and an inclination direction of the monopole 3 on the basis of an attitude detection result from the attitude detector 20, and further computes a vertical component of the inclination angle (an inclination angle in a front-back direction of the monopole 3 with respect to the measurement target 2), and a horizontal component of the inclination angle (an inclination angle in a left-right direction of the monopole 3 with respect to the measurement target 2); a deflection control program for controlling a deflection operation of the optical axis deflector 19; and a computation program that executes various computations. The first storage section 15 also stores various data, such as distance measurement data, angle measurement data, image data, and the like.

The computation controller 14 executes distance measuring by deploying and executing the various programs in accordance with the operating state of the surveying device body 4 to control the distance measuring light emitting section 11, the receiving section 12, the distance measuring computing section 13, the measurement direction imaging section 21, and the like by the surveying device body 4.

Figure 3:
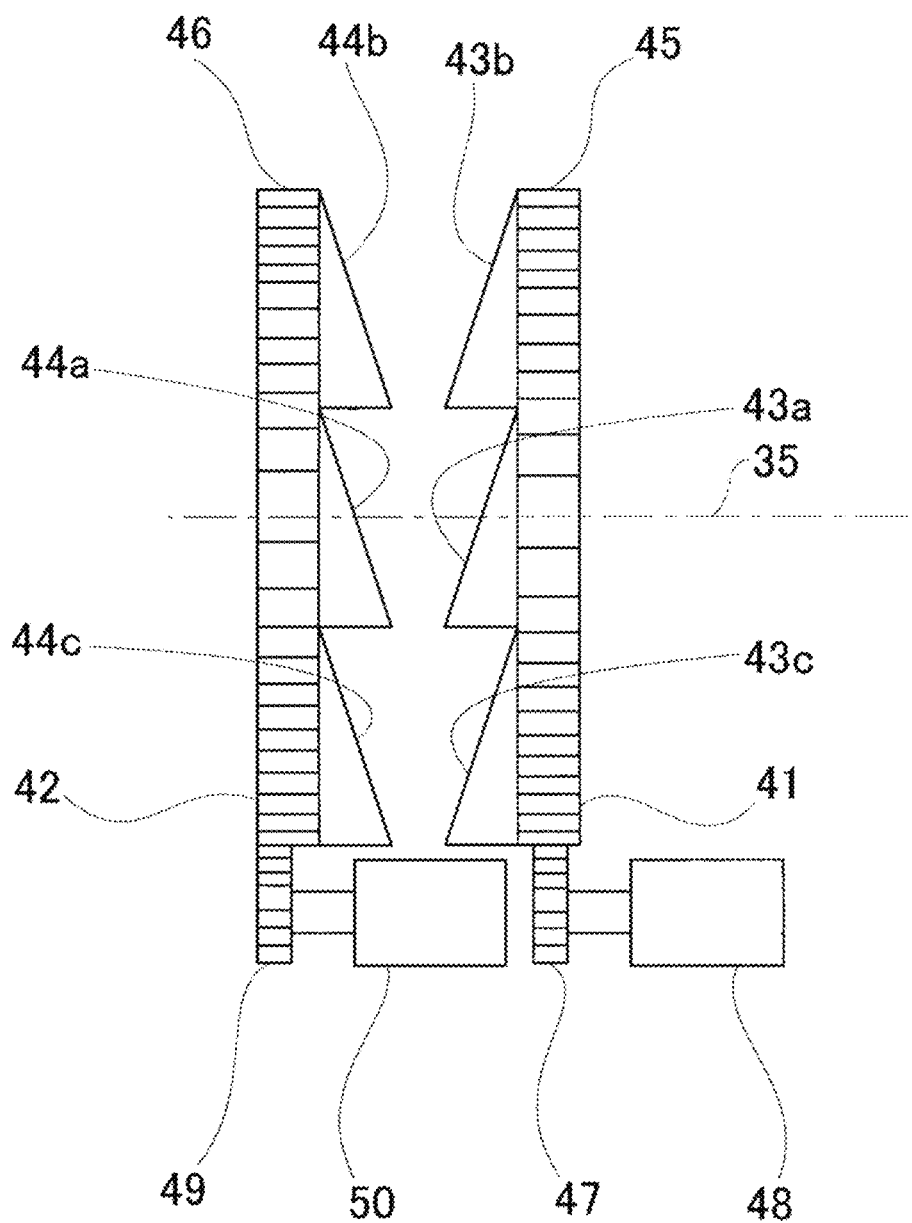
FIG. 3 is an explanatory view of main parts of an optical axis deflector.

The optical axis deflector 19 will be described next with reference to FIG. 3.

The optical axis deflector 19 includes a pair of optical prisms 41, 42. The optical prisms 41, 42 are shaped like discs having the same diameter, are concentrically arranged on the distance measuring optical axis 35 orthogonal to the distance measuring optical axis 35, and disposed in parallel at a predetermined interval. The optical prism 41 is formed using optical glass, and includes three triangular prisms 43a, 43b, 43c disposed in parallel. The optical prism 42 is formed using optical glass, and includes three triangular prisms 44a, 44b, 44c disposed in parallel. Furthermore, the triangular prisms 43a, 43b, 43c and the triangular prisms 44a, 44b, 44c all have the same deflection angle optical characteristics.

The triangular prisms 43a, 43b, 43c and the triangular prisms 44a, 44b, 44c may each have the same or different widths and shapes. The width of the triangular prisms 43a, 44a positioned at the center is greater than a beam diameter of the distance measuring light 33, and the distance measuring light 33 passes through the triangular prisms 43a, 44a only. The triangular prisms 43b, 43c, 44b, 44c may be configured using a large number of small triangular prisms.

Furthermore, the triangular prisms 43a, 44a at the center may be made from optical glass, and the triangular prisms 43b, 43c, 44b, 44c may be made from optical plastic. This is because the distance from the optical axis deflector 19 to the measurement target 2 is long, requiring precision in the optical characteristics of the triangular prisms 43a, 44b, and the distance from the triangular prisms 43b, 43c, 44b, 44c to the light receiving element 39 is short, not requiring high-precision optical characteristics.

A central portion (the triangular prisms 43a, 44a) of the optical axis deflector 19 serves as a distance measuring light deflection section, which is a first optical axis deflector through which the distance measuring light 33 passes and is emitted. The portion aside from the central portion (both end portions of the triangular prisms 43a, 44a, the triangular prisms 43b, 43c, and the triangular prisms 44b, 44c) of the optical axis deflector 19 serves as a reflected distance measuring light deflector, which is a second optical axis deflector through which the reflected distance measuring light 34 passes and is incident.

The optical prisms 41, 42 are each independently and individually rotatably arranged about the reception optical axis 31. The optical prisms 41, 42 are independently controlled in terms of rotation direction, rotation amount, and rotation speed. The optical prisms 41, 42 thereby deflect the emission optical axis 26 of the distance measuring light 33 to be emitted in an arbitrary direction, and deflect the reception optical axis 31 of the received reflected distance measuring light 34 so as to be parallel to the emission optical axis 26.

Additionally, the optical prisms 41, 42 are continually driven and continually deflect while the distance measuring light 33 is continually emitted, making it possible to scan the distance measuring light 33 using a predetermined pattern.

Each of the external profiles of the optical prisms 41, 42 is a circular shape with the distance measuring optical axis 35 (reference optical axis O) as the center. The diameters of the optical prisms 41, 42 are set so as to enable the acquisition of a sufficient amount of light in consideration of the spread of the reflected distance measuring light 34.

A ring gear 45 is fitted on the outer circumference of the optical prism 41, and a ring gear 46 is fitted on the outer circumference of the optical prism 42.

The ring gear 45 is meshed with a drive gear 47, and the drive gear 47 is firmly fixed to an output shaft of a motor 48. Similarly, the ring gear 46 meshes with a drive gear 49, and the drive gear 49 is firmly attached to an output shaft of a motor 50. The motors 48, 50 are electrically connected to the motor driver 23.

The motors 48, 50 used are pulse motors, for example, that can detect a rotation angle or rotate in correspondence with a drive input value. Or, the rotation amounts of the motors 48, 50 may each be detected using a rotation angle detector, such as an encoder, for example, that detects the rotation amount (rotation angle) of the motor. The rotation amounts of the motors 48, 50 are each detected, and the motors 48, 50 are individually controlled by the motor driver 23.

Further, the rotation angles of the optical prisms 41, 42 may be detected via the rotation amounts of the motors 48, 50, that is, the rotation amounts of the drive gears 47, 49. Moreover, encoders may be attached directly to the ring gears 45, 46, and the rotation angles of the ring gears 45, 46 may be detected directly by the encoders.

Here, the deflection angle of the optical axis deflector 19 is small with respect to the rotation angles of the optical prisms 41, 42 (a rotation angle of ±40° for a deflection angle of ±10°, for example), making high-precision deflection possible.

The drive gears 47, 49 and the motors 48, 50 are provided in positions that do not interfere with the distance measuring light emitting section 11, for example, below the ring gears 45, 46.

The projection lens 28, the first reflection mirror 29, the second reflection mirror 32, the distance measuring light deflection section, and the like constitute a projection optical system; and the reflected distance measuring light deflector, the imaging lens 38, and the like constitute a reception light optical system.

The distance measuring computing section 13 controls the light emitting element 27, causing pulse emission or burst emission (intermittent emission) of a laser beam as the distance measuring light 33. The emission optical axis 26 (that is, the distance measuring optical axis 35) of the distance measuring light 33 is deflected toward the measurement target 2 by the triangular prisms 43*a*, 44*a* (distance measuring light deflection section). The distance is measured with the measurement target 2 collimated by the distance measuring optical axis 35.

The reflected distance measuring light 34 reflected from the measurement target 2 is made incident via the triangular prisms 43*b*, 43*c* and the triangular prisms 44*b*, 44*c* (reflected distance measuring light deflector) as well as the imaging lens 38, and is received by the light receiving element 39. The light receiving element 39 sends a light reception signal to the distance measuring computing section 13, and the distance measuring computing section 13 measures the distance of the measurement point (the point which has been irradiated with the distance measuring light) with each pulse of light on the basis of the light reception signal from the light receiving element 39. Distance measurement data are then stored in the first storage section 15.

The emission direction detection section 22 counts the drive pulses input to the motors 48, 50, thereby detecting the rotation angles of the motors 48, 50. Or, the rotation angles of the motors 48, 50 are detected on the basis of signals from the encoders. The emission direction detection section 22 computes the rotation positions of the optical prisms 41, 42 on the basis of the rotation angles of the motors 48, 50.

Furthermore, the emission direction detection section 22 computes the deflection angle and the emission direction of the distance measuring light 33 with respect to the reference optical axis O with each pulse of light on the basis of the refractive indices of the optical prism 41, 42; the rotation positions when the optical prisms 41, 42 are integrated; and the relative rotation angle between the optical prisms 41, 42. The computation result (angle measurement result) is associated with the distance measurement result and input into the computation controller 14. Further, when the distance measuring light 33 is emitted by burst, the distance is measured with each intermittent distance measuring light.

The computation controller 14 controls the rotation direction and the rotation speed of the motors 48, 50; and a rotation ratio between the motors 48, 50, and thus controls the relative rotation and overall rotation of the optical prisms 41, 42 as well as the deflection action by the optical axis deflector 19. Additionally, the computation controller 14 computes the horizontal angle and the vertical angle of the measurement point with respect to the reference optical axis O from the deflection angle and the emission direction of the distance measuring light 33. Furthermore, the computation controller 14 can find three-dimensional data of the measurement by associating the horizontal angle and the vertical angle of the measurement point with the distance measurement data. Thus, the surveying device 1 functions as a total station.

Next, the attitude detector 20 will be described. The attitude detector 20 detects the inclination angle of the surveying device body 4 with respect to the horizontal or the vertical, and the detection result is input into the computation controller 14. As the attitude detector 20, the attitude detector disclosed in JP 2016-151423 A can be used.

The attitude detector 20 will now be simply described. The attitude detector 20 includes a frame 54. The frame 54 is fixed to the housing 25, or is fixed to a structure member and integrated with the surveying device body 4.

A sensor block 55 is attached to the frame 54 via a gimbal. The sensor block 55 freely rotates 360° or 360° or greater in two directions about two orthogonal axes.

A first inclination sensor 56 and a second inclination sensor 57 are attached to the sensor block 55. The first inclination sensor 56 detects the horizontal with high precision and is, for example, an inclination detector that detects the horizontal from changes in the reflection angle of reflected light from detection light made incident on a horizontal liquid surface, or is a bubble tube that detects inclination from changes in position of an encapsulated bubble. Additionally, the second inclination sensor 57 detects inclination changes with high responsiveness and is, for example, an acceleration sensor.

The relative rotation angles of the sensor block 55 to the frame 54 for the two axes are detected by encoders 58, 59.

Additionally, a motor (not illustrated) that rotates the sensor block 55 and keeps the sensor block 55 horizontally is provided for each of the two axes. The motors are controlled by the computation controller 14 on the basis of detection results from the first inclination sensor 56 and the second inclination sensor 57 so as to keep the sensor block 55 horizontally.

In a case where the sensor block 55 is inclined (in a case where the surveying device body 4 is inclined), the relative rotation angle in each axial direction of the frame 54 to the sensor block 55 (horizontal) is detected by the encoders 58, 59. The inclination angle and the inclination direction of the surveying device body 4 are detected by the synthesis of the inclination and the inclination angle of the two axes of the surveying device body 4 on the basis of the detection results from the encoders 58, 59.

The sensor block 55 freely rotates 360° or 360° or greater on two axes, and thus attitude detection can be made in all directions (inclination angle and inclination direction relative to the horizontal) regardless of the attitude of the attitude detector 20, even in cases in which the attitude detector 20 has been inverted top-to-bottom, for example.

The attitude detection and attitude control are carried out on the basis of the detection results from the second inclination sensor 57 when high responsiveness is required. However, the second inclination sensor 57 generally has inferior detection precision compared to that of the first inclination sensor 56.

The attitude detector 20 includes the highly-precise first inclination sensor 56 and the highly-responsive second inclination sensor 57, and controls the attitude on the basis of the detection results from the second inclination sensor 57; further, highly-precise attitude detection can be carried out by the first inclination sensor 56.

The detection results of the second inclination sensor 57 can be corrected using the detection results of the first inclination sensor 56. That is, in a case where the values of the encoders 58, 59 deviate, when the first inclination sensor 56 has detected the horizontal, which is an actual inclination angle, from the inclination angle detected by the second inclination sensor 57, the inclination angle of the second inclination sensor 57 can be corrected on the basis of this deviation.

Thus, the inclination angle detected by the second inclination sensor 57 can be corrected (calibrated) by relationships, acquired in advance, between inclination angles detected by the second inclination sensor 57 and the inclination angles found on the basis of horizontal detection by the first inclination sensor 56 and the detection results from the encoders 58, 59. This makes it possible to improve the precision in the highly-responsive attitude detection carried out by the second inclination sensor 57. In a state where environmental changes (temperature and the like) are minimal, inclination detection may be found using the detection results of the second inclination sensor 57 and compensation values.

The computation controller 14 controls the motors on the basis of signals from the second inclination sensor 57 when inclination fluctuation is significant and when inclination changes are rapid. When inclination fluctuation is small and when inclination changes are gradual, that is, with the first inclination sensor 56 in a trackable state, the computation controller 14 controls the motors on the basis of signals from the first inclination sensor 56. Further, attitude detection may be carried out by the attitude detector 20 on the basis of detection results from the second inclination sensor 57 by always correcting the inclination angle detected by the second inclination sensor 57.

Comparison data indicating the comparison result of the detection results of the first inclination sensor 56 and the detection results of the second inclination sensor 57 are stored in the first storage section 15. The detection results from the second inclination sensor 57 are corrected on the basis of a signal from the first inclination sensor 56. With this correction, the detection results from the second inclination sensor 57 can be increased to the detection precision of the first inclination sensor 56. Thus, high responsiveness of attitude detection by the attitude detector 20 can be achieved while maintaining high precision.

The computation controller 14 computes a tilt angle in the front-back direction of the monopole 3 (tilt angle in the direction of approaching and receding from the measurement target 2) and a tilt angle in the left-right direction of the monopole 3 from the detection results from the attitude detector 20. The tilt angle in the front-back direction appears as the tilt angle of the reference optical axis O with respect to the horizontal, and the tilt angle in the left-right direction appears as the tilt (rotation) of the image obtained by the measurement direction imaging section 21.

The computation controller 14 computes the inclination angle of the distance measuring optical axis 35 with respect to the horizontal by the tilt angles and the deflection angle by the optical axis deflector 19. Further, the tilt of the image displayed on a display unit 68 (described later) is corrected on the basis of the tilt of the image, and displayed as a vertical image.

The measurement direction imaging section 21 includes the first imaging optical axis 61 parallel with the reference optical axis O of the surveying device body 4, and an imaging lens 62 arranged in the first imaging optical axis 61. The measurement direction imaging section 21 is a camera having a field angle substantially equivalent to a maximum deflection angle $\theta/2$ (±30°, for example) from the optical prisms 41, 42, such as a field angle of 50° to 60°, for example. The relationship between the first imaging optical axis 61, the emission optical axis 26, and the reference optical axis O is known. The first imaging optical axis 61, the emission optical axis 26, and the reference optical axis O are parallel, and the distances between each optical axis are known values.

Further, the measurement direction imaging section 21 is capable of obtaining a static image, a continuous image, or a streaming image. The image obtained by the measurement direction imaging section 21 is sent to the control panel 7, and displayed as an observation image 81 on the display unit 68 (described later) of the control panel 7. The operator can perform measurement work by observing the image displayed on the display unit 68. Control is performed so that the center of the observation image 81 coincides with the first imaging optical axis 61 and, on the basis of the known relationship between the first imaging optical axis 61 and the reference optical axis O, the center of the observation image 81 coincides with the reference optical axis O or substantially coincides with the reference optical axis O (so as to deviate at a predetermined field angle).

The imaging controller 16 controls the imaging of the measurement direction imaging section 21. When the measurement direction imaging section 21 images the streaming image or continuous image, the imaging controller 16 synchronizes the timing at which the frame images constituting the streaming image or continuous image are obtained and the timing at which scanning and distance measuring are performed by the surveying device body 4. The computation controller 14 also associates the images with measurement data (distance measurement data and angle measurement data). Further, the imaging controller 16 controls the synchronization of the imaging timing between the measurement direction imaging section 21 and the downward imaging section 5 via the first communication section 18 and a second communication section 67 (refer to FIG. 5).

An imaging element 63 of the measurement direction imaging section 21 is a charge-coupled device (CCD), which is an assembly of pixels, or a complementary metal-oxide semiconductor (CMOS) sensor, and the position of each pixel on the image element can be specified. For example, each pixel has pixel coordinates on a coordinate system with the first imaging optical axis 61 as the origin point, and the position on the image element is specified by pixel coordinates. Further, the relationship between the first imaging optical axis 61 and the reference optical axis O is known, making it possible to associate the measurement position from the distance measuring section 24 and the position on the imaging element 63. The image signal output from the imaging element 63 is input into the image processor 17 via the imaging controller 16.

The deflection action and scanning action of the optical axis deflector 19 will be described next with reference to FIGS. 4A to 4C.

Figure 4A:
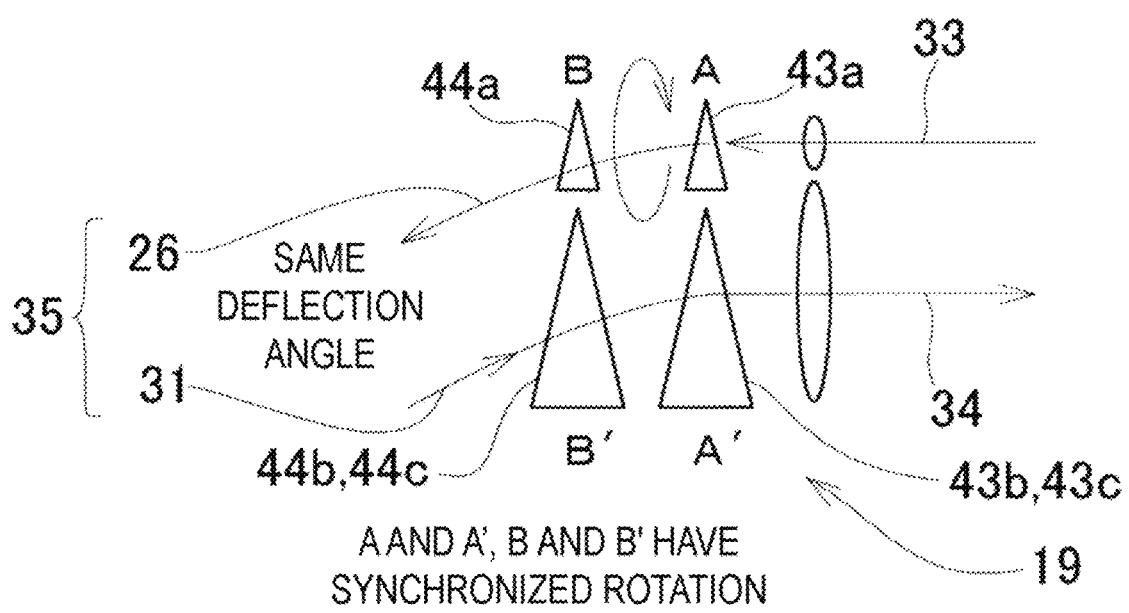
FIGS. 4A to 4C are explanatory views illustrating actions of the optical axis deflector.

Further, to simplify the explanation, FIG. 4A illustrates the optical prisms 41, 42 separated into the triangular prisms 43a, 44a, and the triangular prisms 43b, 43c, 44b, 44c. Further, FIG. 4A illustrates the triangular prisms 43a, 44a and the triangular prisms 43b, 43c, 44b, 44c positioned in the same direction; in this state, the maximum deflection angle (30°, for example) is obtained. Further, the minimum deflection angle is an angle in which one of the optical prisms 41, 42 is rotated 180° with respect to the other, and the mutual optical actions of the optical prisms 41, 42 are offset, making the deflection angle 0°. Thus, the optical axis (the distance measuring optical axis 35) of the laser beam emitted and received through the optical prisms 41, 42 coincides with the reference optical axis O.

The distance measuring light 33 is produced from the light emitting element 27, becomes a parallel luminous flux by the projection lens 28, passes through the distance measuring light deflection section (the triangular prisms 43a, 44a), and is emitted toward the measurement target 2. Here, the distance measuring light 33 passes through the distance measuring light deflection section, and thus is deflected in a prescribed direction by the triangular prisms 43a, 44a and then emitted (FIG. 4A).

Here, the distance measuring light 33 passes through the triangular prisms 43a, 44a in its entirety and the optical action of the triangular prisms 43a, 44a is received. However, because the optical action is from a single optical member, the deflection accuracy is high without luminous flux disturbance. Furthermore, optical glass is used as the triangular prisms 43a, 44a, further increasing deflection accuracy.

The reflected distance measuring light 34 reflected by the measurement target 2 is made incident by passing through the reflected distance measuring light deflector, and then is focused on the light receiving element 39 by the imaging lens 38.

As a result of the reflected distance measuring light 34 passing through the reflected distance measuring light deflector, the optical axis of the reflected distance measuring light 34 is deflected by the triangular prisms 43b, 43c and the triangular prisms 44b, 44c so as to coincide with the reception optical axis 31 (FIG. 4A).

Here, optical plastic or Fresnel prisms, which are assemblies of minute triangular prisms, may be used for the triangular prisms 43b, 43c and the triangular prisms 44b, 44c used in the reflected distance measuring light deflector. With the distance between the optical axis deflector 19 and the light receiving element 39 being short, the reflected distance measuring light deflector does not require high precision.

The deflection direction and deflection angle of the emitted distance measuring light 33 can be arbitrarily changed according to the combination of rotational positions of the optical prism 41 and the optical prism 42.

Moreover, in a state where the positional relationship between the optical prism 41 and the optical prism 42 is fixed (in a state where the deflection angle obtained by the optical prism 41 and the optical prism 42 is fixed), when the optical prism 41 and the optical prism 42 are rotated together as one by the motors 48, 50, a path drawn by the distance measuring light 33 passing through the distance measuring light deflection section is a circle with the reference optical axis O (see FIG. 2) as the center.

Thus, when the optical axis deflector 19 is rotated while the light emitting element 27 emits a laser beam, the distance measuring light 33 can scan along a circular path. Further, needless to say, the reflected distance measuring light deflector integrally rotates with the distance measuring light deflection section.

Figure 4B:
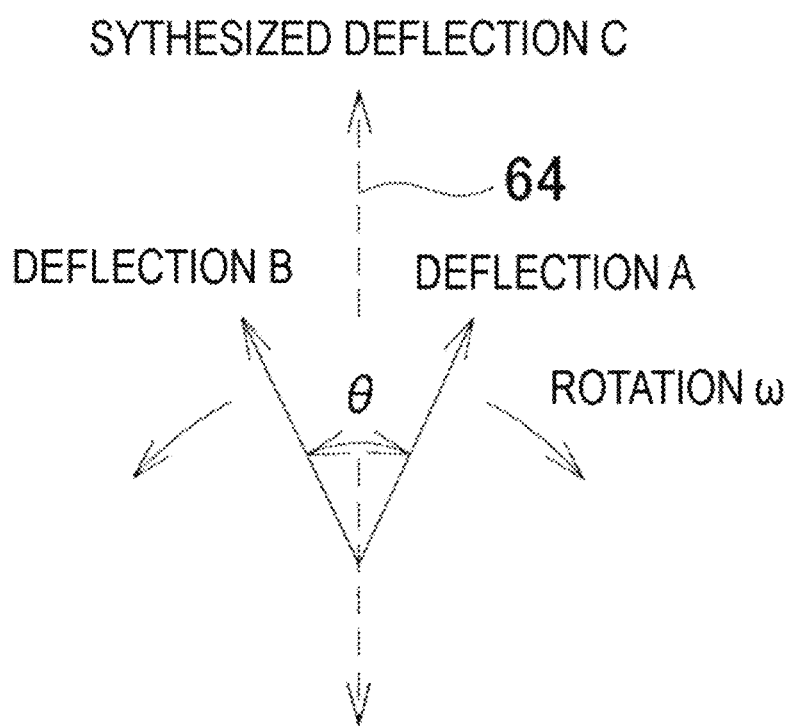

FIG. 4B illustrates when the optical prism 41 and the optical prism 42 are rotated relative to each other. Given deflection A as the deflection direction of the optical axis deflected by the optical prism 41 and deflection B as the deflection direction of the optical axis deflected by the optical prism 42, then the deflection of the optical axis by the optical prisms 41, 42 is a synthesized deflection C having an angular difference θ between the optical prisms 41, 42.

Thus, when the optical prism 41 and the optical prism 42 are rotationally oscillated to-and-fro in opposite directions in synchronization to each other at equal speeds, the distance measuring light 33 that passed through the optical prisms 41, 42 is linearly scanned. Thus, by rotationally oscillating the optical prism 41 and the optical prism 42 to-and-fro in the opposite direction at equal speeds, it is possible to scan the distance measuring light 33 to-and-fro on a path 64 in the synthesized deflection C direction, as illustrated in FIG. 4B.

Figure 4C:
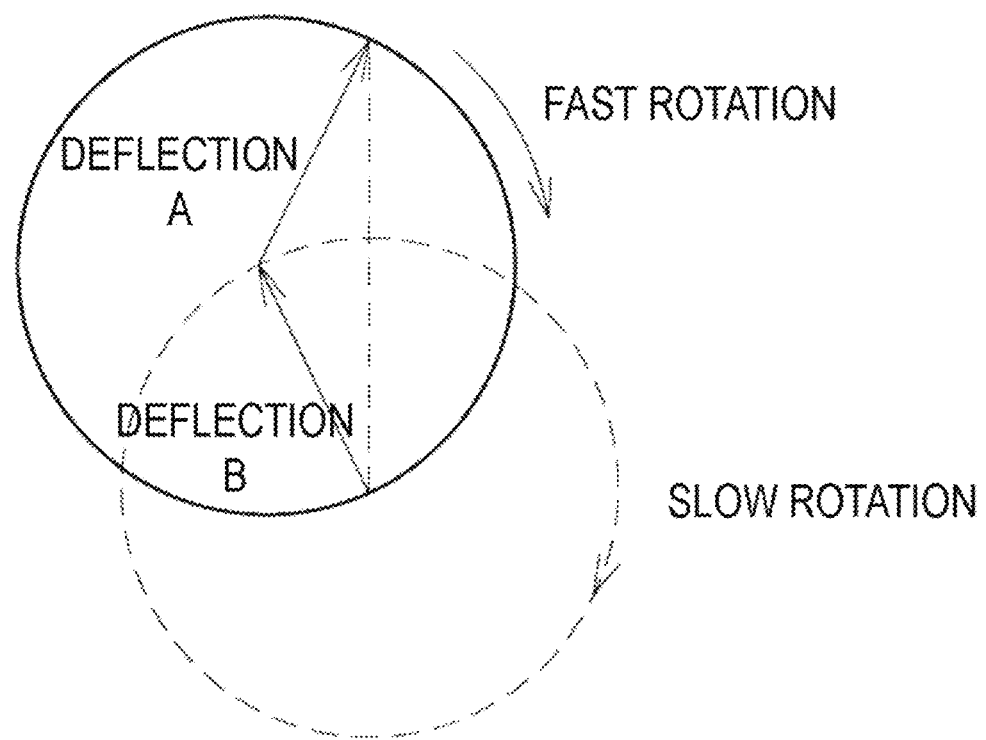

Furthermore, as illustrated in FIG. 4C, when the optical prism 42 is rotated at a rotation speed that is slower than the rotation speed of the optical prism 41, the distance measuring light 33 is rotated while the angular difference θ gradually increases. This causes the scan path of the distance measuring light 33 to take on a spiral shape.

Additionally, controlling the rotation directions and rotation speeds of the optical prism 41 and the optical prism 42 individually makes it possible to achieve a variety of two-dimensional scan patterns in which the scan path of the distance measuring light 33 is centered on the reference optical axis O.

Figure 6:
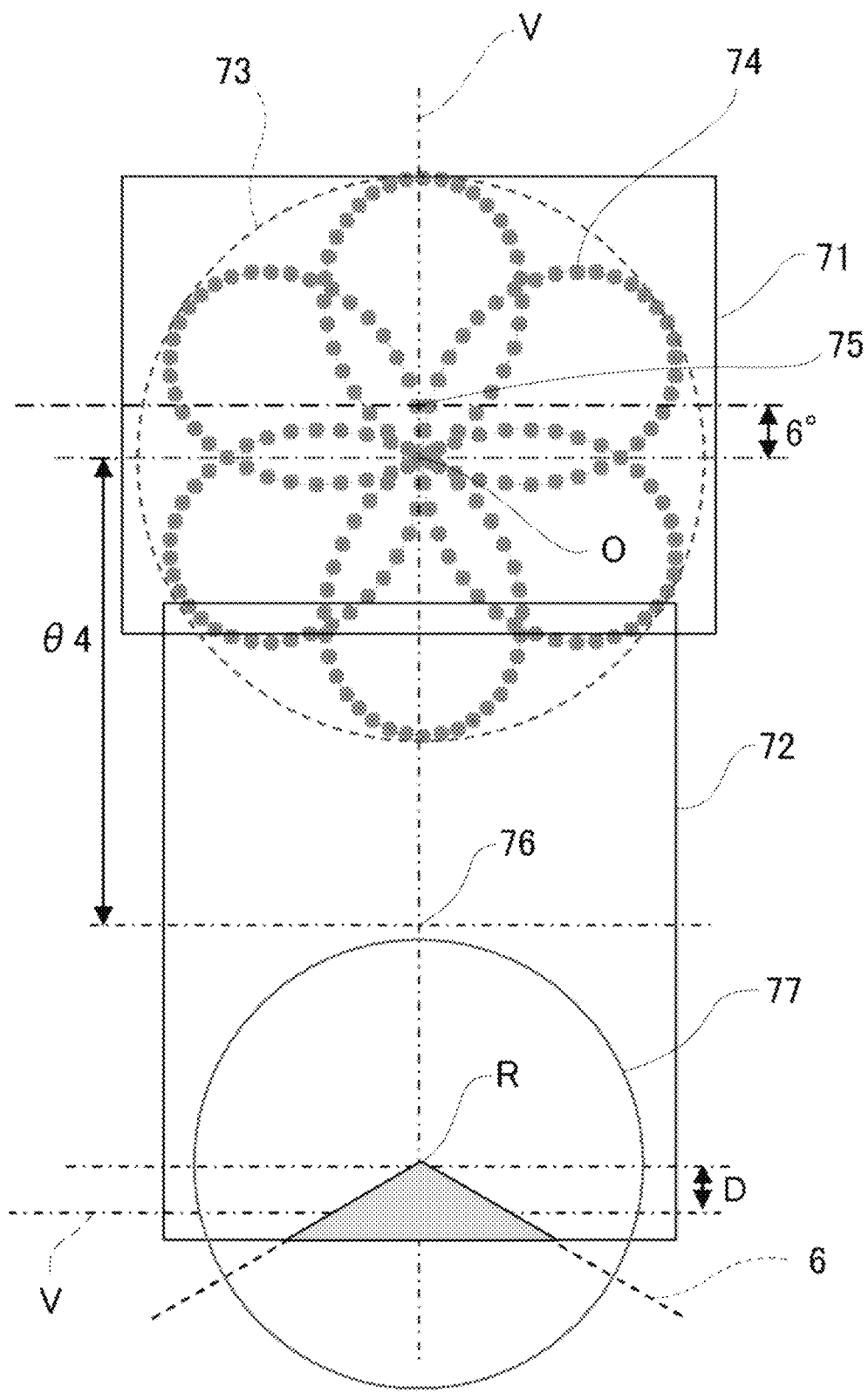
FIG. 6 is a diagram illustrating the relationship between images obtained by a measurement direction imaging section and by a downward imaging section, and a scan path by the surveying device body.
Figure 7:
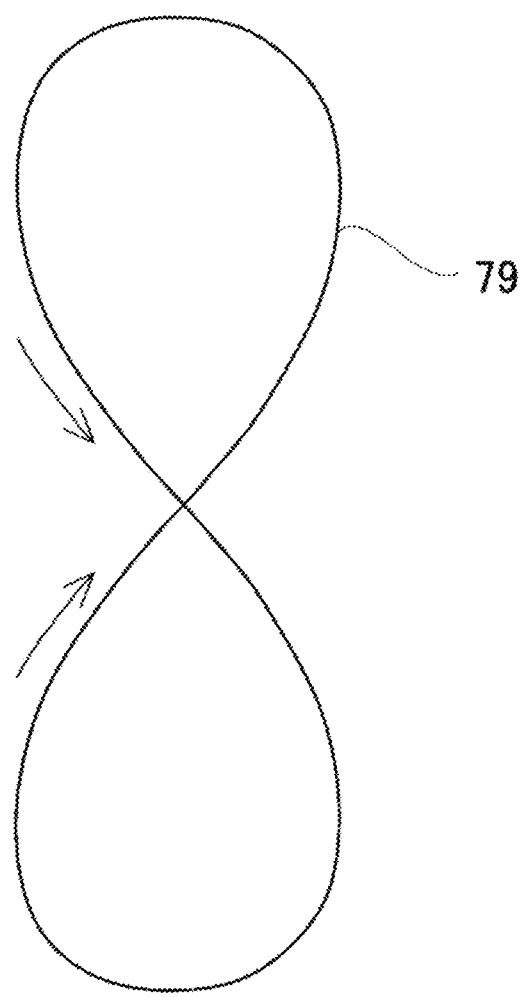
FIG. 7 is a diagram illustrating an example of a two-dimensional scanning pattern.

For example, of the optical prism 41 and the optical prism 42, by rotating one optical prism 41 25 times, and the other optical prism 42 five times in the opposite direction, it is possible to obtain a flower petal shaped two-dimensional closed loop scan pattern (flower petal pattern 74 (inner trochoid curves)) such as illustrated in FIG. 6, or by setting the rotation ratio of the optical prism 41 and the optical prism 42 to 1:2, it is possible to obtain a figure eight shaped two-dimensional figure-eight pattern 79 such as illustrated in FIG. 7.

Next, the downward imaging section 5 will be described.

The downward imaging section 5 is electrically connected with the surveying device body 4, and image data obtained by the downward imaging section 5 are input into the surveying device body 4.

The imaging of the downward imaging section 5 is controlled in synchronization with the imaging of the measurement direction imaging section 21 and the distance measuring of the distance measuring section 24 by the imaging controller 16. The downward imaging section 5 is provided in a known position relative to the machine center of the surveying device body 4, and the distance between the downward imaging section 5 and the lower end of the monopole 3 is also known.

Furthermore, the relationships of the second imaging optical axis 8 of the downward imaging section 5 are known, such as the angle formed with the reference optical axis O and the position of intersection between the reference optical axis O and the second imaging optical axis 8. The image data obtained by the downward imaging section 5 are stored in the first storage section 15 in association with the image obtained by the measurement direction imaging section 21 and the distance measurement data measured by the distance measuring section 24 by the computation controller 14.

Figure 5:
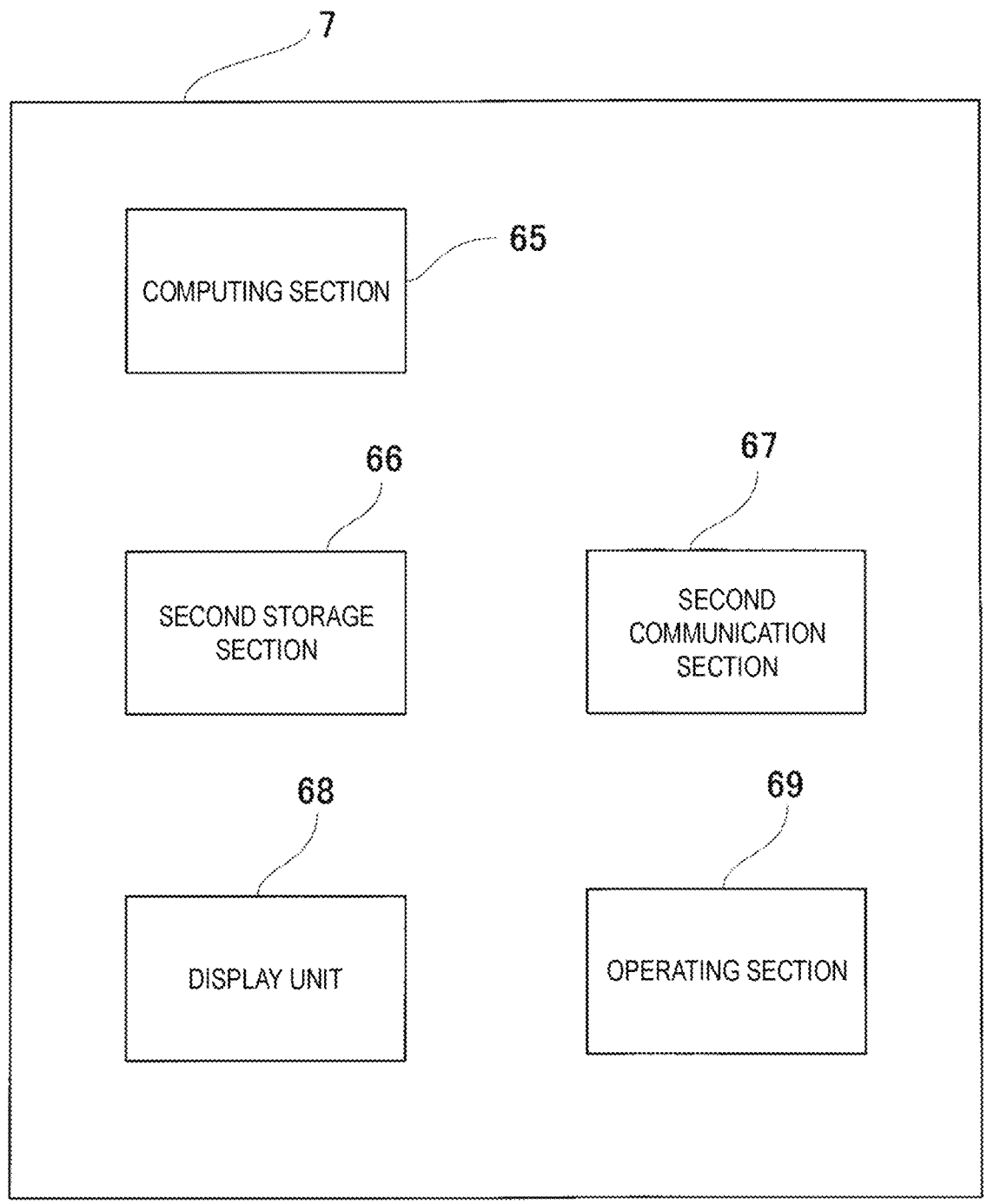
FIG. 5 is a general block diagram of a control panel.

Next, the control panel 7 will be simply described with reference to FIG. 5.

The control panel 7, as described above, may be provided in a fixed manner to the monopole 3, or may be detachable. When detachable, the control panel 7 may b e operable when held by an operator in a single unit state upon removal from the monopole 3.

The control panel 7 is mainly provided with a computing section 65, a second storage section 66, the second communication section 67, the display unit 68, and an operating section 69. Furthermore, the display unit 68 may be a touch panel, and the operating section 69 may also serve as the display unit 68. Further, when the display unit 68 is a touch panel, the operating section 69 may be omitted.

The second storage section 66 stores various programs such as a communication program for communicating with the surveying device body 4; an image processing program for performing processing such as synthesizing images obtained by the downward imaging section 5 and images obtained by the measurement direction imaging section 21; a display program for displaying images obtained by the downward imaging section 5, images obtained by the measurement direction imaging section 21, and measurement information measured by the distance measuring section 24 on the display unit 68; and a command creation program for creating commands to the surveying device body 4 from information operated using the operating section 69.

The second communication section 67 communicates data such as measurement data, image data, and commands to the image processor 17 through the computation controller 14 and the first communication section 18.

The display unit 68 displays the measurement status, measurement results, and the like of the surveying device body 4, and displays the images obtained by the downward imaging section 5 and the measurement direction imaging section 21, or the images processed by the image processor 17. Further, the display unit 68 displays all field angle images obtained by the measurement direction imaging section 21 as the observation image 81. Furthermore, when a measurement point (collimation point) is specified on the observation image 81, the image processor 17 cuts out a prescribed range from the observation image 81 with the collimation point as the center, and the cut-out image is enlarged and displayed as a collimation image 82 (refer to FIGS. 9A and 9B).

Here, the collimation image 82 is an image centered on the distance measuring optical axis 35 deflected by the optical axis deflector 19 (the distance measuring optical axis 35 and the reference optical axis O coincide when the distance measuring optical axis 35 is not deflected), and is enlarged and displayed on the display unit 68 at a predetermined magnification (3× to 10×, for example). Various directives, such as directives related to measurement work, can be input from the operating section 69 to the surveying device body 4. Further, the display of the observation image 81 and the display of the collimation image 82 can be switch from the operating section 69.

As the control panel 7, a smartphone or a tablet, for example, may be used. Further, the control panel 7 may be used as a data collector.

Next, the measurement action of the surveying device 1 will be described with reference to FIGS. 1 to 6. The measurement action below is performed when the computation controller 14 executes programs stored in the first storage section 15.

As preparation for measurement, the lower end of the monopole 3 is positioned on the reference point R, and the operator holds the monopole 3 substantially vertically. The control panel 7 is attached to the monopole 3. The downward imaging section 5 and the measurement direction imaging section 21, in this operation state, are installed to the surveying device 1.

When the reference optical axis O is directed to the measurement target 2, the monopole 3 is rotated about the lower end of the monopole 3, or the monopole 3 is inclined to the front-back and left-right, or is rotated with a spiral-like motion. The observation image 81 centered on the reference optical axis O is displayed on the display unit 68, allowing the confirmation of the direction and position of the reference optical axis O from the observation image 81.

Once the direction of the reference optical axis O is confirmed, the observation image 81 indicates the measurable range with the reference optical axis O maintained, allowing the specification of an arbitrary point within the observation image 81 as a measurement point (measurement target 2) and measurement of the measurement target 2. With the specification of the measurement target 2, the computation controller 14 directs the distance measuring optical axis 35 to the measurement target 2 using the optical axis deflector 19.

The distance measuring optical axis 35 is directed to the measurement target 2, the measurement target 2 is irradiated with the distance measuring light 33, and the measurement (distance measurement and angle measurement) of the measurement target 2 is performed. The collimation image 82 is displayed on the display unit 68, and the direction of the distance measuring light 33, the distance measurement result, and the like are displayed on the collimation image 82. Moreover, when the operator wants to confirm the position of the collimation image 82 with respect to the observation image 81, the operator switches from the collimation image 82 to the observation image 81. A frame 83 or the like indicating the position of the collimation image 82 is preferably displayed on the observation image 81.

When the measurement target 2 is changed or moved to the measurement target 2 of another location, the display of the display unit 68 is returned to the observation image 81, allowing the operator to specify a measurement point once again from the observation image 81. However, the measurement point can also be moved by tilting and rotating the monopole 3 while leaving the collimation image 82 displayed.

The center of the collimation image 82 is the position (direction) of the distance measuring optical axis 35, making it possible to make the distance measuring optical axis 35 coincide with the measurement point by operating the monopole 3 so that the center of the collimation image 82 coincides with the measurement point. At this time, although the distance measuring optical axis 35 and the reference optical axis O do not necessarily coincide, a positional deviation between the center of the collimation image 82 and the center of the observation image 81 on the imaging element 63 can be converted to an angular difference between the direction angles of the distance measuring optical axis 35 and the reference optical axis O. Further, the inclination of the reference optical axis O with respect to the horizontal is detected by the attitude detector 20, and thus the inclination angle of the distance measuring optical axis 35 is detected on the basis of the detection results of the attitude detector 20 and the positional deviation. Further, measurement is performed by irradiating the measurement point with the distance measuring light 33.

Furthermore, when the monopole 3 is operated (tilted) and the distance measuring optical axis 35 is collimated to the measurement point using the collimation image 82, the collimation image 82 may be moved at a predetermined movement magnification angle (an angle αquivalent to 0.5×, 1×, 2×, or 3× with respect to the inclination angle of the monopole 3, for example) with respect to the tilt angle or change in the tilt angle of the monopole 3 to improve workability. Further, the movement magnification angle may be fixed or switchable. Further, as described above, the tilt angle and the change in tilt angle of the monopole 3 are detected by the attitude detector 20.

Figure 8:
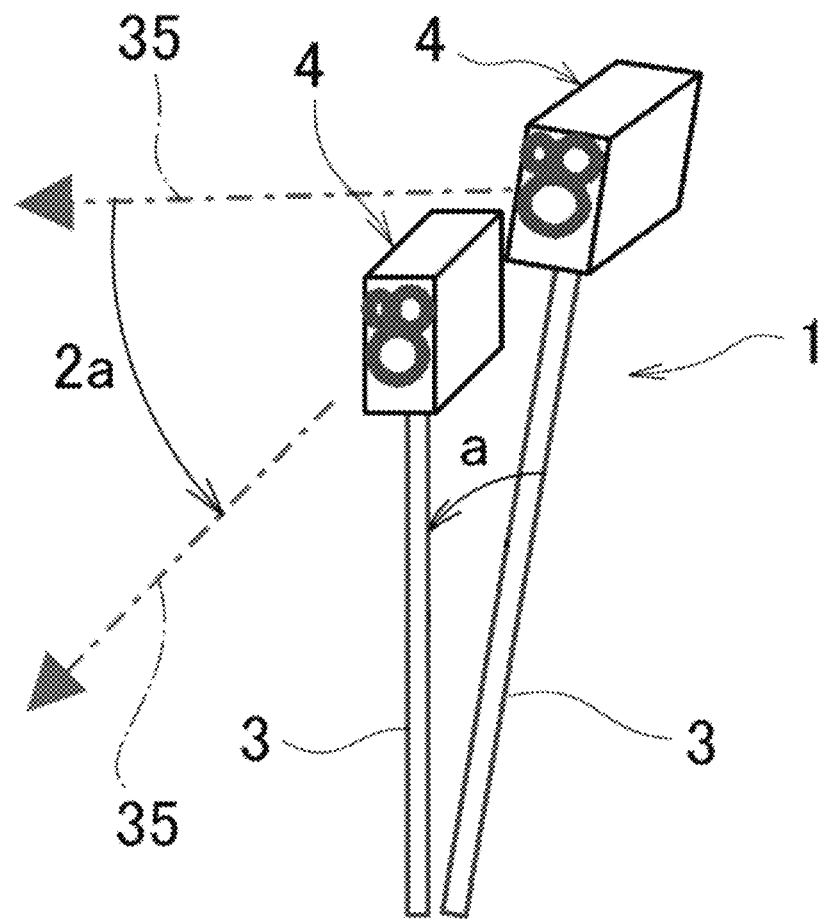
FIG. 8 is an explanatory view of a collimation operation of the surveying device according to the present embodiment.
Figure 9A:
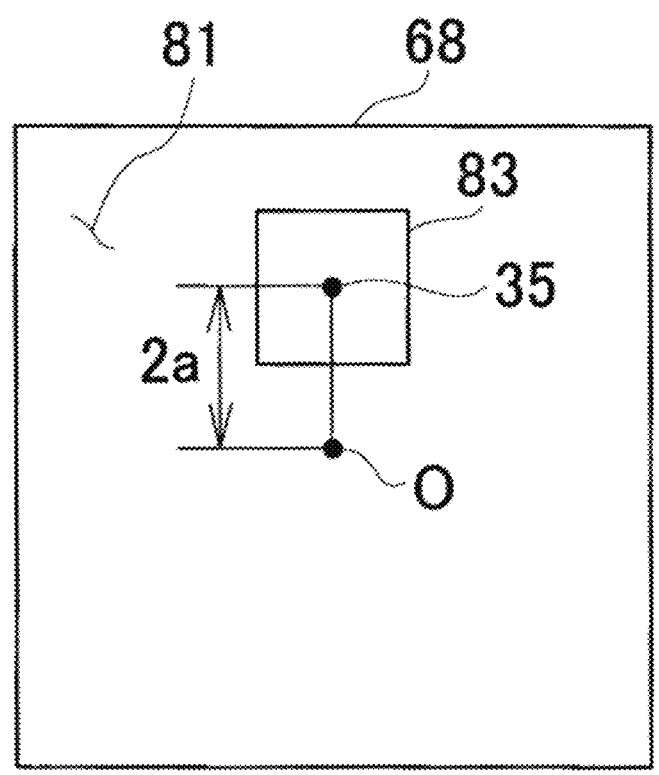
FIGS. 9A and 9B are diagrams illustrating the relationship between an observation image and a collimation image of a collimation operation.
Figure 9B:
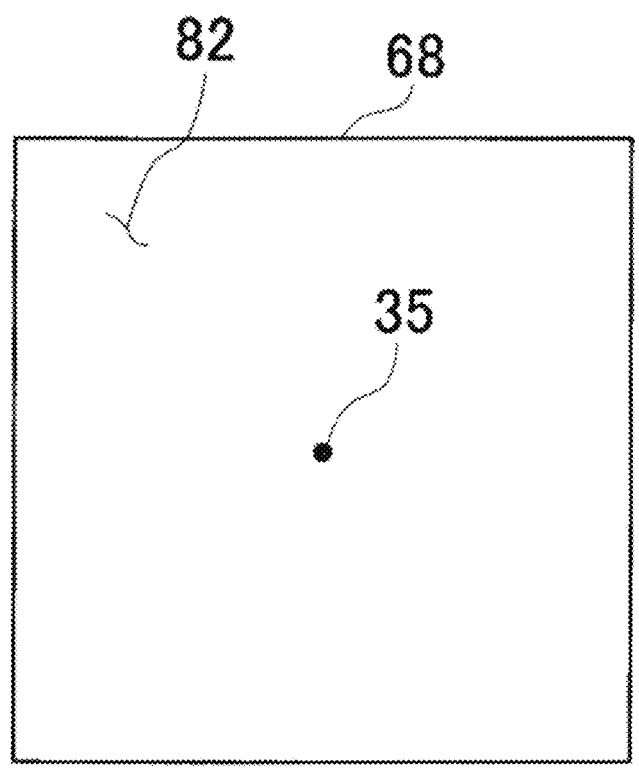

For example, as illustrated in FIGS. 8, 9A, and 9B, when the movement magnification angle is set 2× with respect to the fixed magnification, the collimation image 82 can be moved on the basis of an angle multiplier of 2 by moving the collimation image 82 in an amount equivalent to an inclination angle a in the inclination direction of the monopole 3. That is, 2a is obtained as the total of the tilt amount a of the monopole 3 and the movement amount a of the collimation image 82. Thus, when the inclination angle of the distance measuring optical axis 35 is set to 40, the inclination amount of the monopole 3 is 20, making it no longer necessary to significantly tilt the monopole 3 and improving workability.

Further, as for the movement of the collimation image 82, when the collimation image 82 is cut off from the observation image 81, the collimation image 82 may be cut off with a position equivalent to the inclination angle a as the center, in a direction corresponding to the inclination direction of the monopole 3 on the observation image 81, with respect to the movement of the inclination angle a and the inclination direction of the monopole 3.

Furthermore, as long as movement of the collimation image 82 is displayed in real-time on the display unit 68 with respect to movement of the inclination angle a of the monopole 3, the work state and the change in the collimation position can be confirmed visually, further improving workability.

Furthermore, when the movement magnification angle is switchable and the center of the collimation image 82 (that is, the distance measuring optical axis 35) is near the measurement point, setting the movement magnification to 1× or 0.5× decreases the amount of movement of the collimation image 82 with respect to the inclination amount (operation amount) of the monopole 3, making it easy to make the distance measuring optical axis 35 coincide with the measurement point.

When the collimation state of the distance measuring optical axis 35, that is, the state in which the distance measuring optical axis 35 aligns with the measurement target 2, is maintained, the measurement operator may hold the monopole 3, or pull out the auxiliary pole 6 and support the monopole 3 with the auxiliary pole 6.

With the monopole 3 supported by the auxiliary pole 6, tilting of the monopole 3 in the front-back direction and rotation of the monopole 3 about the lower end of the monopole 3 are suppressed, and the supported state of the surveying device 1 is stabilized.

The incline of the surveying device 1 with respect to the horizontal is detected in real-time by the attitude detector 20, and thus the inclination angle and the inclination direction of the surveying device 1 with respect to the horizontal are detected in real-time, making it possible to correct the measurement result in real-time on the basis of the detection results. Thus, there is no need for leveling work for adjusting the surveying device 1 to the horizontal, and fluctuation in the inclination angle by the minute vibration and the like that occurs from the operator holding the monopole 3 can also be corrected in real-time.

Next, the detection of the rotation angle in the horizontal direction about the lower end of the monopole 3 will be described with reference to FIG. 6.

In FIG. 6, 71 denotes a first image acquisition range of the measurement direction imaging section 21, 72 denotes a second image acquisition range of the downward imaging section 5, 73 denotes a deflecting range of the distance measuring optical axis 35 by the optical axis deflector 19, and 74 denotes a path when scanning is performed using a flower petal pattern by the optical axis deflector 19 while the flower petal pattern is irradiated with the distance measuring light a plurality of times. The dots illustrated in the flower petal pattern 74 indicate the points which were irradiated with the distance measuring light a plurality of times. Further, 75 denotes an image center of the first image acquisition range 71 (the image center 75 coincides with the first imaging optical axis 61), and 76 denotes an image center of the second image acquisition range 72 (the image center 76 coincides with the second imaging optical axis 8).

Further, in FIG. 1, θ1 denotes a field angle of the measurement direction imaging section 21, θ2 denotes a field angle of the downward imaging section 5, and θ3 denotes a scanning range of the surveying device body 4.

Furthermore, in FIG. 6, the angle between the first imaging optical axis 61 and the second imaging optical axis 8 is 60°, for example, and the reference optical axis O is inclined downward by 6°, for example, with respect to the first imaging optical axis 61, that is, θ4 is 54°. Further, FIG. 6 illustrates a state in which the monopole 3 is maintained at an incline of 5° rearward (in a direction receding from the measurement target 2).

The second imaging optical axis 8 is directed downward, and the image acquisition range is set so as to include the lower end of the monopole 3. Thus, the image obtained by the downward imaging section 5 includes the reference point R, and the image of the range on the measurer side (a range of substantially 80 in the diagram) is included.

The image is set as a rotation detection image 77 having a predetermined radius with the reference point R as the center, and obtained in real-time.

The rotation detection image 77 at the start of measurement is obtained and set as a rotation reference image 77*a*.

When the rotation angle after the start of measurement is detected, the rotation change of the rotation detection image 77 about the reference point R with respect to the rotation reference image 77*a* is detected, and the rotation angle is computed on the basis of the rotation change. The rotation angle is converted to a horizontal angle on the basis of the detection results of the attitude detector 20. Further, the horizontal angle may be detected by performing projective transformation on the rotation detection image 77 on the basis of the detection results of the attitude detector 20, transforming the image to a horizontal image, and then detecting the change in horizontal rotation to find the horizontal angle.

Next, as illustrated in FIG. 1, when the measurement target 2 is measured by the surveying device body 4, a slope distance to the measurement target 2 is measured, the deflection angle (6° in FIG. 6) of the reference optical axis O with respect to the first imaging optical axis 61 and the deflection angle of the distance measuring optical axis 35 with respect to the reference optical axis O are detected by the emission direction detection section 22, the inclination angle of the surveying device body 4 with respect to the horizontal is detected by the attitude detector 20, the inclination angle of the distance measuring optical axis 35 with respect to the horizontal is computed, and the horizontal rotation change of the monopole 3 is detected from the rotation detection image 77.

The slope distance is corrected to the horizontal angle on the basis of the inclination angle of the distance measuring optical axis 35 with respect to the horizontal, and the direction angle is computed on the basis of the inclination angle of the distance measuring optical axis 35 with respect to the horizontal and the detected horizontal angle. Further, because the length of the monopole 3 as well as the tilt of the monopole 3 with respect to the first imaging optical axis 61 are known, the three-dimensional coordinates of the measurement target 2 based on the lower end of the monopole 3 (that is, the reference point R) are found.

Further, computations such as computation of the horizontal angle, computation of the inclination angle of the distance measuring optical axis 35, and computation of the horizontal distance may be executed by the computation controller 14 or by the computing section 65.

While measurement is performed using an action similar to that of a total station with the distance measuring optical axis 35 fixed to the measurement point in the description above, measurement can be made using the surveying device 1 as a laser scanner as well.

As illustrated in FIG. 6, the optical axis deflector 19 can freely deflect the distance measuring optical axis 35 within the range of a deflecting range 73. By controlling the rotation of the optical prism 41 and the optical prism 42, it is possible to perform scanning on the path of the flower petal pattern 74. The distance measurement data along the path of the flower petal pattern 74 can be obtained by irradiating the path of the flower petal pattern 74 with a pulse distance measuring light during the scanning process. Further, when a distance measurement data density (scanning density) is increased, the flower petal pattern 74 may be rotated by a predetermined angle in a circumferential direction with each pattern scan of the flower petal pattern 74. Further, the first image and the second image are obtained in synchronization with the scan. Here, a scan of the deflecting range 73 (that is, the maximum deflecting range of the optical axis deflector 19) is referred to as a full range scan.

Further, when the scan center is moved (when the scanning range is moved) while executing a full range scan, the monopole 3 is rotated about the axial center or rotated with a spiral-like motion about the lower end, or the tilt angle of the monopole 3 is changed. The direction angle of the reference optical axis O after the scan center is moved is detected in real-time by the attitude detector 20. Then, the distance measurement data of the desired direction and the desired range can be easily obtained.

Further, when the first image obtained by the measurement direction imaging section 21 and the second image obtained by the downward imaging section 5 are to be synthesized, it is possible to synthesize the images using an overlapping portion of both images. Or, as illustrated in FIG. 6, the first image and the second image can be immediately synthesized by executing scanning so that a portion of the flower petal pattern 74 is included in the second image acquisition range 72 and using the distance measurement data along the path in the first image and the distance measurement data along the path in the second image.

Further, the data along the paths used for synthesizing may be the data along the paths commonly included in the first image and the second image, or the first image and the second image may be synthesized using the coordinate values of the data along the paths individually included in the first image and the second image.

By synthesizing the first image and the second image, it is possible to obtain an observation image of an extensive range, including from the reference point R to the measurement target 2, simplifying the confirmation of the measurement range and measurement position and improving workability. Further, an image including three-dimensional data can be obtained for each pixel by associating the first image or the synthesized image and the data along the path obtained by two-dimensional scanning.

While controlling the rotation of the optical prisms 41, 42 makes it possible to scan the distance measuring light 33 using various patterns, it is also possible to scan the distance measuring light 33 while limiting range to a portion of the deflecting range 73. Here, scanning a portion of the deflecting range 73 is referred to as a local scan.

A local scan is, for example, executed in the range of the collimation image 82, and point group data are obtained in the range of the collimation image 82.

Figure 10A:
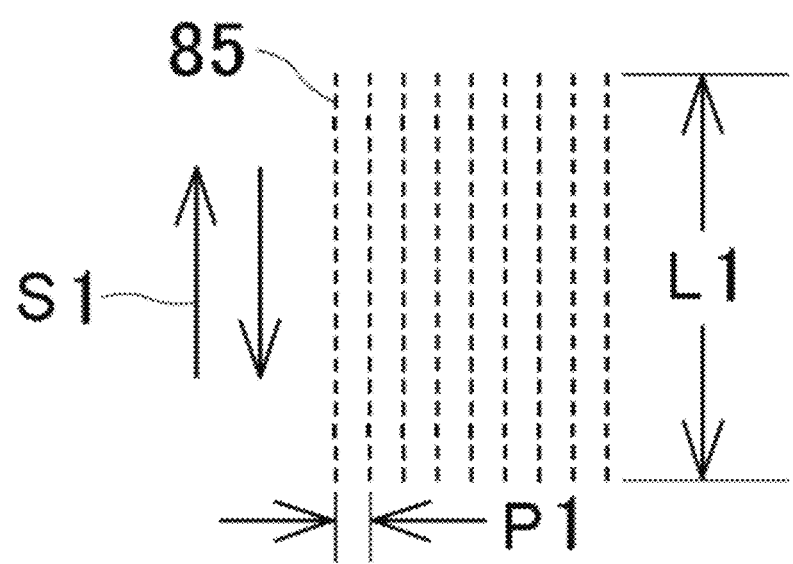
FIGS. 10A and 10B are diagrams illustrating examples of local patterns.
Figure 10B:
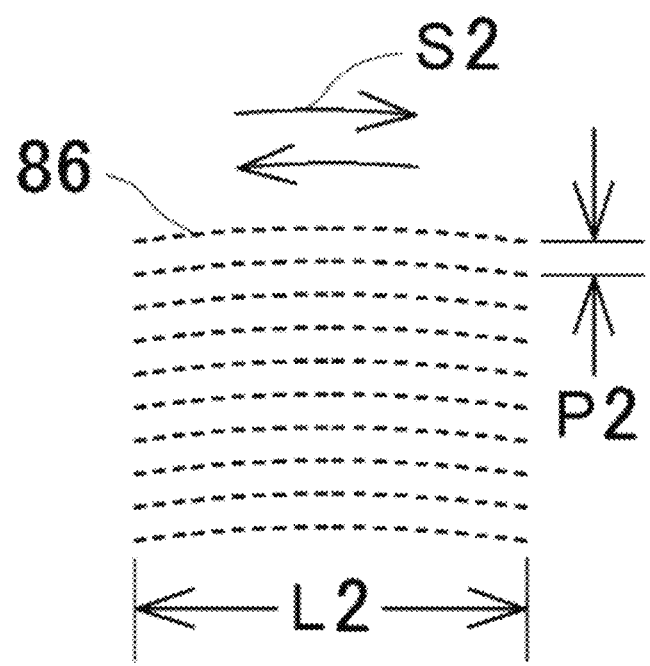

FIGS. 10A and 10B illustrate examples of patterns for executing a local scan. Other patterns include a circle, a figure-eight pattern, and the like.

A scanning pattern 85 illustrated in FIG. 10A is obtained by integrally rotating the optical prisms 41, 42 by a predetermined angle step P1 with each linear scan illustrated in FIG. 4B. In FIG. 10A, 51 denotes the scanning direction.

A scan pattern 86 illustrated in FIG. 10B is obtained by setting the deflection angle of the distance measuring optical axis 35 by the optical prisms 41, 42; integrally rotating the optical prisms 41, 42 by a predetermined angle, arc-scanning in the circumferential direction; and changing the deflection angle by a predetermined feeding step P2 in the radial direction with each arc scan. Further, in FIG. 10B, S2 denotes the scanning direction.

Further, when a local scan is executed, an effective local scan cannot be obtained in a range centered on the reference optical axis O due to the structure of the optical axis deflector 19. Therefore, when a local scan is executed, the center of the local scan is set to a position separated from the reference optical axis O by a prescribed angle.

For example, the local scan is programmed so that the center of the local scan is not within 5° from the reference optical axis O. When a local scan is executed within the range of the collimation image 82, the initial setup position of the collimation image 82 is set to a position in which the center of the collimation image 82 is 5° or more away from the reference optical axis O.

Figure 11:
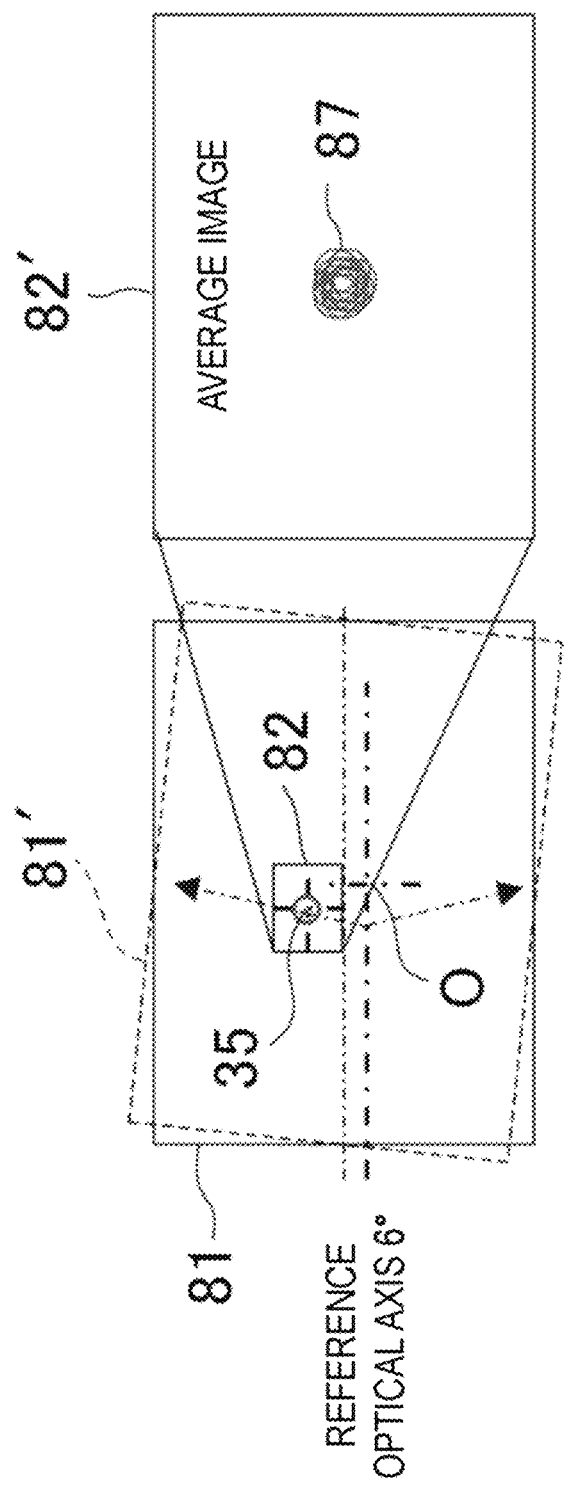
FIG. 11 is a diagram illustrating the relationship between an average image and a measurement scan path.

In a monopole support system, stability is limited, and the monopole 3 fluctuates during measurement. As a result, the distance measuring optical axis 35 also continually fluctuations during measurement. In the present embodiment, a predetermined number of images, eight for example, are obtained utilizing this fluctuation, and an average image is created (refer to FIG. 11). The fluctuation of the distance measuring optical axis 35 appears as movement between the obtained images.

The measurement points included in each image are in the same positions (have the same coordinates), and image tilts can be corrected to obtain a vertical image (or horizontal image) by the detection results from the attitude detector 20. Thus, by comparing many positions of measurement points between images, it is possible to detect the amount of movement between images at the pixel level or below (sub-pixel level). Higher definition can then be achieved by superimposing and averaging the images on the basis of detection results. In actuality, the pixels are overlapped and averaged in 4×4 sections. This makes it possible to obtain images at a precision equivalent to that obtained when the number of pixels is four times the total pixel quantity of the light emitting element 27.

Further, when the collimation image 82 is cut out from the observation image 81, an observation image 81', which is inclined, is displayed on the display unit 68 according to the tilt of the monopole 3 in the left-right direction. However, as long as the direction in which the collimation image 82 is cut out is always the vertical direction on the display screen of the display unit 68, a vertical collimation image 82 can be easily obtained (refer to FIG. 11). Furthermore, an average image 82' can be obtained by superimposing obtained collimation images.

Further, the obtained data of the local scan (minute circle, for example) are moved in accordance with the movement amount and superimposed on the average image 82', and the measurement scan path is displayed. This path becomes a measurement scan path 87 (refer to FIG. 11) in accordance with the fluctuation, and thus an area scan can be achieved as a result.

Figure 12:
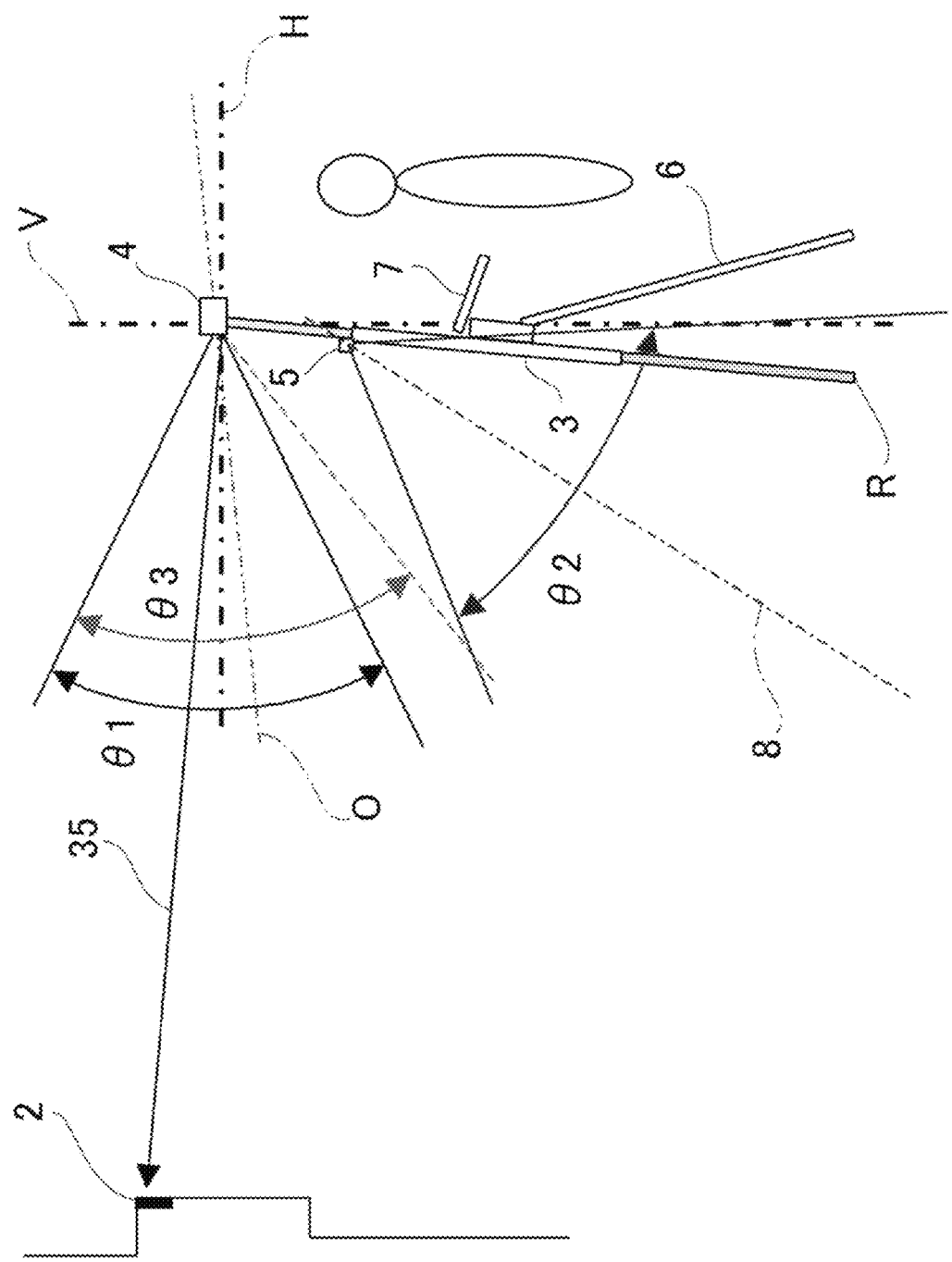
FIG. 12 is a schematic view illustrating a second embodiment.

FIG. 12 illustrates a second embodiment. Note that the same reference signs are appended in FIG. 12 to equivalent parts to those of FIG. 1, and description thereof is omitted.

In the second embodiment, the monopole 3 is extendable, and has a structure that allows extension at a predetermined known interval (a 10-cm interval, for example) and fixing at an extended length.

Further, in the second embodiment, the downward imaging section 5 is detachable from the surveying device body 4 and, when the surveying device body 4 is attached to an extending section of the monopole 3, the downward imaging section 5 is attached to a fixing section of the monopole 3, and the monopole 3 is extended, while only the height of the surveying device body 4 is changed.

In the second embodiment, the height of the surveying device body 4 can be changed in accordance with the height of the measurement target 2, simplifying the correction of the distance measurement data and like.

Figure 13:
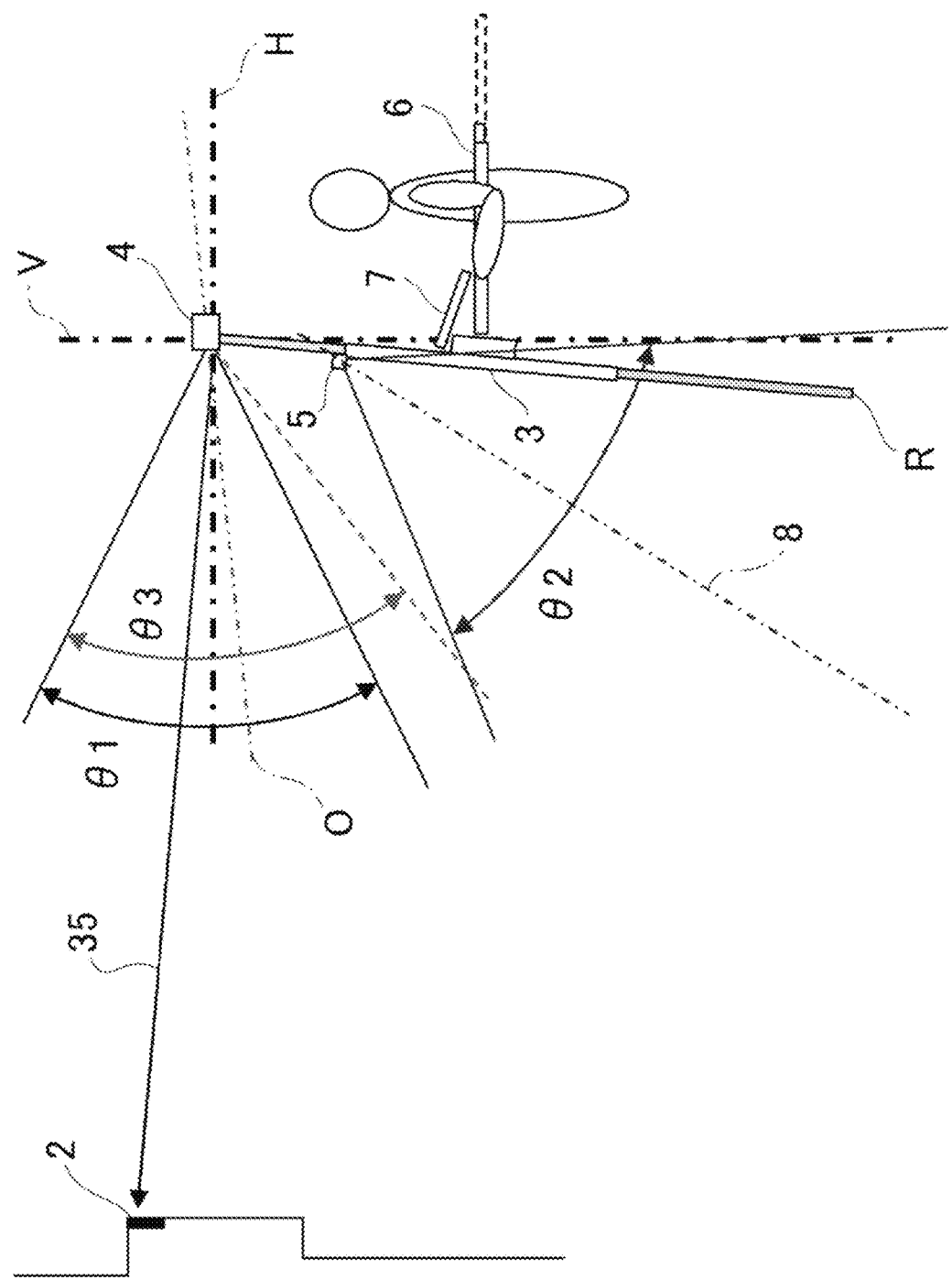
FIG. 13 is a schematic view illustrating a third embodiment.

FIG. 13 illustrates a third embodiment. Note that the same reference signs are appended in FIG. 13 to equivalent parts to those of FIG. 1, and description thereof is omitted.

In the third embodiment, the rotation range of the auxiliary pole 6 is enlarged, and the auxiliary pole 6 is rotatable to the horizontal substantially, or to the horizontal or beyond. Further, the auxiliary pole 6 is provided with an extendable structure.

As one mode of measurement work in the third embodiment, the auxiliary pole 6 is shortened, the auxiliary pole 6 is inserted into an underarm of the operator, and the monopole 3 is fixed into place. In the third embodiment, both hands of the operator are free, making two-handed work possible. Furthermore, the auxiliary pole 6 can be used as a handle when rotated about the axial center of the monopole 3, or titled about the lower end, or rotated with a spiral-like motion, improving workability.

While the surveying device body 4 including the optical axis deflector 19 and being capable of two-dimensional scanning is used as the surveying device body in the embodiment above, a surveying device body including only a distance measuring function may be provided. In this case, while scan data cannot be obtained, installation work such as the leveling work of the surveying device 1 is not required, making installation easy and enabling the measurement of three-dimensional coordinates of desired measurement points.

Furthermore, in this case, a commercial laser rangefinder can be used as the surveying device body 4, making it possible to inexpensively configure the surveying device 1.

What is claimed is:

1. A surveying device, comprising:
a monopole to be installed on a reference point;
a surveying device body, with a reference optical axis, provided at a known distance from a lower end of the monopole and at a known angle with respect to an axial center of the monopole; and
a control panel provided to the monopole and comprising a display unit;
the surveying device body comprising a distance measuring section that irradiates a measurement target with a distance measuring light and receives a reflected distance measuring light to measure a distance to the measurement target, an optical axis deflector that deflects the distance measuring light with respect to the reference optical axis, a measurement direction imaging section that obtains an observation image centered about or substantially centered about the reference optical axis and that includes the measurement target, an attitude detector that detects an incline of the surveying device body with respect to the horizontal, and a computation controller; and
the computation controller displaying a portion of the observation image on the display unit as a collimation image, deflecting a distance measuring optical axis by the optical axis deflector on the basis of a difference between a center of the observation image and a center of the collimation image in the observation image so that the distance measuring optical axis becomes the center of the collimation image, computing a direction angle of the distance measuring optical axis on the basis of a detection result of the attitude detector and a deflection angle of the distance measuring optical axis with respect to the reference optical axis, and measuring the measurement target on the basis of the direction angle and a distance measurement result of the distance measuring section using the reference point as a reference.

2. The surveying device according to claim 1, wherein the computation controller is configured to control the optical axis deflector so that the deflection angle becomes a predetermined magnification of an inclination angle detected by the attitude detector.

3. The surveying device according to claim 1, wherein the computation controller is configured to rotate an image displayed on the display unit on the basis of a detection result of the attitude detector so that the image is controlled to become vertical.

4. The surveying device according to claim 1, wherein the computation controller is configured to control the optical axis deflector so that the distance measuring light is locally scanned with the distance measuring optical axis serving as the center.

5. The surveying device according to claim 1, wherein the computation controller is configured to detect fluctuation during measurement from movement between a plurality of images, superimpose the plurality of images to create an average image, change local scan data during measurement in accordance with fluctuation detection, and overlay the local scan data on the average image.

\* \* \* \* \*